United States Patent
Youm et al.

(10) Patent No.: US 7,538,693 B2
(45) Date of Patent: May 26, 2009

(54) METHOD AND APPARATUS FOR UPDATING DECODER CONFIGURATION

(75) Inventors: Sun-hee Youm, Seoul (KR); Kyung-sun Cho, Seoul (KR); Jeong-hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/776,169

(22) Filed: Jul. 11, 2007

(65) Prior Publication Data

US 2008/0012737 A1 Jan. 17, 2008

Related U.S. Application Data

(60) Provisional application No. 60/830,114, filed on Jul. 12, 2006.

(30) Foreign Application Priority Data

Mar. 8, 2007 (KR) ...................... 10-2007-0023192

(51) Int. Cl.
*H03M 7/00* (2006.01)
(52) U.S. Cl. ........................... 341/50; 341/51; 370/235; 370/463
(58) Field of Classification Search .................. 341/50, 341/51; 375/259, 222; 370/352, 463
See application file for complete search history.

(56) References Cited

U.S. PATENT DOCUMENTS

| 6,507,611 | B1 * | 1/2003 | Imai et al. ................... 375/222 |
| 2001/0031013 | A1 * | 10/2001 | Stetzler et al. .............. 375/259 |
| 2002/0035725 | A1 * | 3/2002 | Ando .......................... 725/32 |
| 2002/0080779 | A1 * | 6/2002 | LeBlanc ..................... 370/352 |
| 2003/0163477 | A1 | 8/2003 | Visharam et al. |
| 2006/0107295 | A1 | 5/2006 | Margis et al. |

FOREIGN PATENT DOCUMENTS

EP 1353512 A1 10/2003

\* cited by examiner

*Primary Examiner*—Jean B Jeanglaude
(74) *Attorney, Agent, or Firm*—Sughrue Mion, PLLC

(57) ABSTRACT

A method of and apparatus for updating decoding information are provided. A method of transmitting media data includes generating a media stream including one or more media data items, one or more decoding information of the media stream, and information for arranging updating of the decoding information; and transmitting the media stream, the one or more decoding information item of the media stream, and the information for arranging updating of the decoding information, in which the one or more media data items have decoding information that are different from each other. According to the method and apparatus, the amount of data to be processed and the complexity of data processing can be reduced, thereby reducing an encoding time and a media data processing time in a decoder.

36 Claims, 6 Drawing Sheets

METHOD AND APPARATUS FOR UPDATING DECODER CONFIGURATION

CROSS-REFERENCE TO RELATED PATENT APPLICATIONS

This application claims priority from Korean Patent Application No. 10-2007-0023192, filed on Mar. 8, 2007 in the Korean Intellectual Property Office, and U.S. Provisional Patent Application No. 60/830,114, filed on Jul. 12, 2006 in the U.S. Patent and Trademark Office, the disclosures of which are incorporated herein in their entirety by reference.

BACKGROUND OF THE INVENTION

1. Field of the Invention

The present invention relates to a method of and apparatus for updating decoder configuration, and more particularly, to a method of and apparatus for updating decoding information in order to transmit media data items having different decoding information, as one media stream, and a method of and apparatus for receiving media data.

2. Description of the Related Art

In general, when media data is transmitted, a media stream is generated in relation to each media data item, and information on the media stream required for receiving and processing the media stream is defined, and then, the media stream and the information on the media stream are transmitted. Accordingly, while transmitting one media stream, in order to transmit another media data item having a different media characteristic, the existing media stream is removed, another media stream is generated for the other media data item, information on the other media stream is defined, and then, the other media stream and the information on the other media stream are transmitted.

When a data service using one or more media stream is provided, in order to transmit a media data item having a decoding information different from that of the media stream, the transmission side should transmit to a reception side a command to remove the media stream being originally transmitted, then define a new media stream and transmit the new media stream and information on the new media stream. That is, whenever a media data item is desired to be changed to a new media data item having a characteristic different from that of the original media data item, the process of removing the existing media stream, and defining and generating the new media stream should be performed. In particular, in an environment where a rich media service, including a variety of media, such as text, images, and moving pictures, is provided, it is inefficient to perform this process whenever a media data item is desired to be changed and provided.

SUMMARY OF THE INVENTION

The present invention provides a method of and apparatus for transmitting media data for updating decoding information.

The present invention also provides a method of and apparatus for receiving media data for updating decoding information.

According to an aspect of the present invention, there is provided a method of transmitting media data including: generating a media stream including one or more media data items, one or more decoding information of the media stream, and information for arranging updating of the decoding information; and transmitting the media stream, the one or more decoding information of the media stream, and the information for arranging updating of the decoding information, wherein the one or more media data items have decoding information that are different from each other.

According to another aspect of the present invention, there is provided an apparatus for transmitting media data including: a media stream generation unit which generates one or more media data items as one media stream; a decoding information generation unit which generates one or more decoding information of the media stream and information for arranging updating of the decoding information; and a transmission unit which transmits the media stream, the decoding information, and the information for arranging updating of the decoding information, wherein the one or more media data items have decoding information that are different from each other.

According to another aspect of the present invention, there is provided a method of receiving media data including: receiving a media stream including one or more media data items, one or more decoding information of the media stream, and information for arranging updating of the decoding information; decoding the media stream by using the decoding information of the media stream; determining whether or not a current decoding information is valid, based on the information for arranging updating of the decoding information; and, if the current decoding information is not valid, receiving a next decoding information and decoding the media stream by using the next decoding information, wherein the one or more media data items have decoding information that are different from each other.

According to another aspect of the present invention, there is provided an apparatus for receiving media data including: a reception unit which receives a media stream including one or more media data items, one or more decoding information of the media stream, and information for arranging updating of the decoding information; and a decoding unit which decodes the media stream by using the decoding information of the media stream, determines whether or not a current decoding information is valid, based on the information for arranging updating of the decoding information, and, if the current decoding information is not valid, receives a next decoding information item and decodes the media stream by using the next decoding information, wherein the one or more media data items have decoding information that are different from each other.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1A:
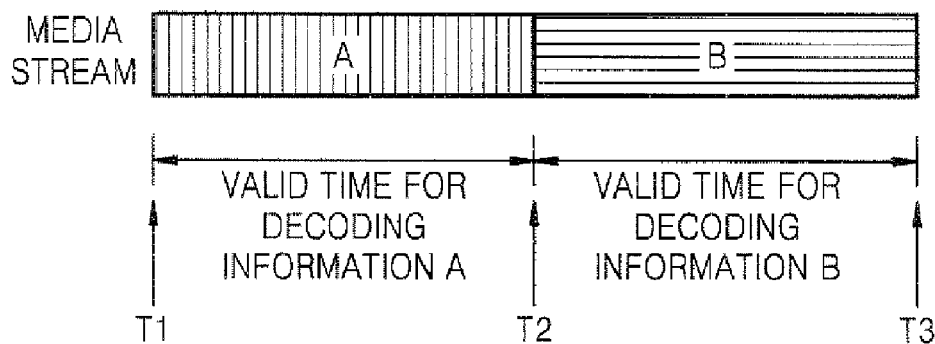
FIGS. 1A through 1C are diagrams illustrating media streams for updating decoding information according to an exemplary embodiment of the present invention.
Figure 1B:
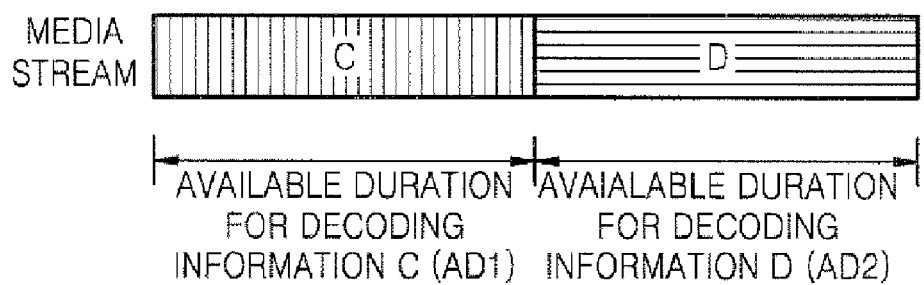
Figure 1C:
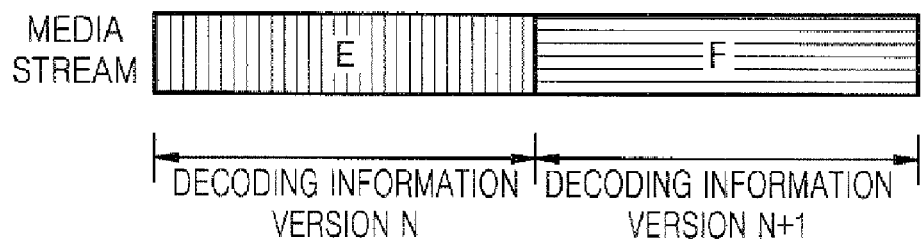

FIGS. 1A through 1C are diagrams illustrating media streams for updating decoding information according to an exemplary embodiment of the present invention.

According to related art technology, in order to transmit media data items having decoding information that are different from each other, a newly and separately defined media stream should be generated for each media data item. Here, a media stream corresponds to an elementary stream in a Moving Picture Experts Group (MPEG) system.

However, in the media stream as illustrated in FIGS. 1A through 1C, one media stream is generated for two media data items having characteristics different from each other. In the exemplary embodiment of the present invention, one media stream may be one media stream in a physical sense. In addition, for example, in a case where identification numbers of media streams are identical such that a media data reception apparatus can recognize and process the media streams as identical media streams, those media streams can be regarded as one media stream in a logical sense.

FIGS. 1A through 1C illustrate media streams (A, B, C, D, E, F) having decoding information that are different from each other. Each of FIGS. 1A through 1C illustrates two media data items included in one media stream. However, there is no limit to the type and number of media data items which have different characteristics, i.e., decoding information that are different from each other, which can be included in one media stream.

The decoding information includes codec information and a variety of information items required for decoding media data, such as resolution information of the media data. The decoding information can be transmitted in a variety of methods according to a transmission system. For example, in the case of an MPEG-4 system, it can be defined in a syntax called DecoderSpecificInfo of an object descriptor (OD), and then transmitted. According to an exemplary embodiment of the present invention, the decoding information can include information for arranging updating of the decoding information. According to another exemplary embodiment of the present invention, in addition to decoding information, the information for arranging updating of the decoding information may exist separately from the decoding information. For example, the information for arranging updating of the decoding information may be transmitted together or simultaneously with the decoding information to a media data reception apparatus.

Referring to FIG. 1A, decoding information A, which is the decoding information of media data A, includes valid time information indicating a time when the decoding information A is valid.

For example, the valid time information can be expressed as T1 and T2 indicating the start and end, respectively, of the time when the decoding information A is valid. Accordingly, a media data reception apparatus receiving the media stream illustrated in FIG. 1A can learn the time when the decoding information A is applied, by using the valid time information included in the decoding information A about the media data A. Accordingly, if it is time T2, the decoding information A is not used in the media data reception apparatus any more, and new decoding information B of media data B is received, and the media data B included in the media stream is decoded. The new decoding information B also includes information T2 and T3 indicating the start and end, respectively, of a time when a decoding information B is valid.

Referring to FIG. 1B, decoding information C of media data C includes available duration information indicating an available duration of the decoding information C. The available duration information can be expressed as AD1, which is the available duration of the decoding information C. Accordingly, in FIG. 1B, the media data reception apparatus receiving the media stream can learn a time when the decoding information C is applied, by using the available duration AD1 included in the decoding information C in relation to the media data C. For example, the media stream is decoded by using the decoding information C during a time obtained by adding the available duration AD1 to a composition time stamp (CTS) of the media data C, and then, new decoding information D of media data D is received, thereby decoding the media data D included in the media stream. Likewise, available duration information AD2 can also be included in the new decoding information D.

Referring to FIG. 1C, decoding information E of media data E includes version N, which is version information of the decoding information E. Accordingly, the media data reception apparatus receiving the media stream of FIG. 1C decodes the media stream by using the decoding information E whose version is version N. While decoding the media stream, if decoding information whose version is version N is received, the media data reception apparatus continues decoding and ignores the reception of the decoding information. If the version of a newly received decoding information changes to version N+1 as illustrated in FIG. 1C, the media data reception apparatus decodes the media stream by using the newly received decoding information. That is, the media data F is decoded using the version N+1 decoding information.

Also, the information for arranging updating of the decoding information may be an update command for commanding the media data reception apparatus to update the decoding information. In this case, unlike the exemplary embodiments described above with reference to FIGS. 1A through 1C, in which the information for arranging updating of the decoding information is included in the decoding information, the information for arranging updating of the decoding information may exist separately outside the decoding information, and may be transmitted together with the decoding information.

For example, it is assumed that a command indicating that information is decoding information is defined as 0×01, and an update command indicating that information is update decoding information is defined as 0×02. In the media data reception apparatus, while media data is decoded by using the decoding information indicated by the command defined as 0×01, if the update command defined as 0×02 is received, the remaining media data can be decoded by using the decoding information indicated by the update command defined as 0×02. Since updating can be performed many times, a plurality of update commands indicating that information is update decoding information can exist.

As illustrated in FIGS. 1A through 1C, when the decoding information includes the information for arranging updating of the decoding information, a media data transmission apparatus can be implemented such that only a command indicating that information is decoding information, for example, 0×01, can be repeatedly transmitted. In this aspect, the method of this exemplary embodiment can be distinguished from a method of commanding updating of decoding information by using a command. In this way, information on each update command is shared by the media data transmission apparatus and the media data reception apparatus, and the media data transmission apparatus can efficiently transmit media data having decoding information items that are different from each other, by using the updated decoding information. Also, the media data reception apparatus can efficiently decode media data, by using the updated decoding information.

Figure 2:
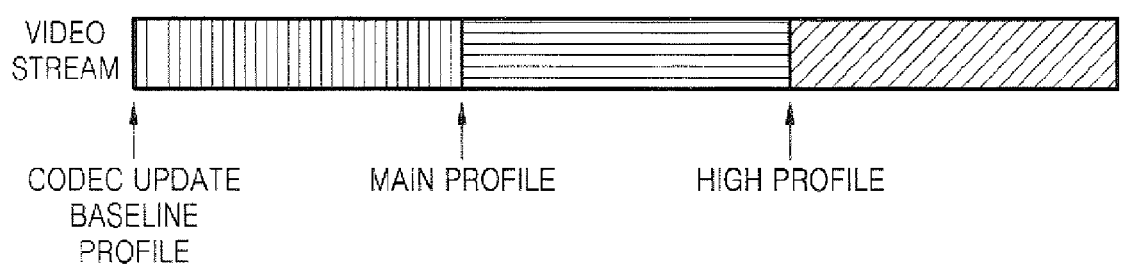
FIG. 2 is a diagram illustrating a video stream according to an exemplary embodiment of the present invention.

FIG. 2 is a diagram illustrating a video stream according to an exemplary embodiment of the present invention.

The video stream illustrated in FIG. 2 is a media stream formed of only video data, and includes video data corresponding to codecs that use an H.264 baseline profile, a main profile, and a high profile standard. According to related art technology, in order to transmit a video stream having codes different from each other, each video data item should be generated as a separate media stream, and then transmitted. However, according to an exemplary embodiment of the present invention, it is not required to separately generate and transmit a video stream of each profile. Instead, by transmitting the information for arranging updating of the decoding information in addition to the decoding information, video data items having decoding information that are different from each other can be included in one media stream, and the media stream can be transmitted.

Figure 3:
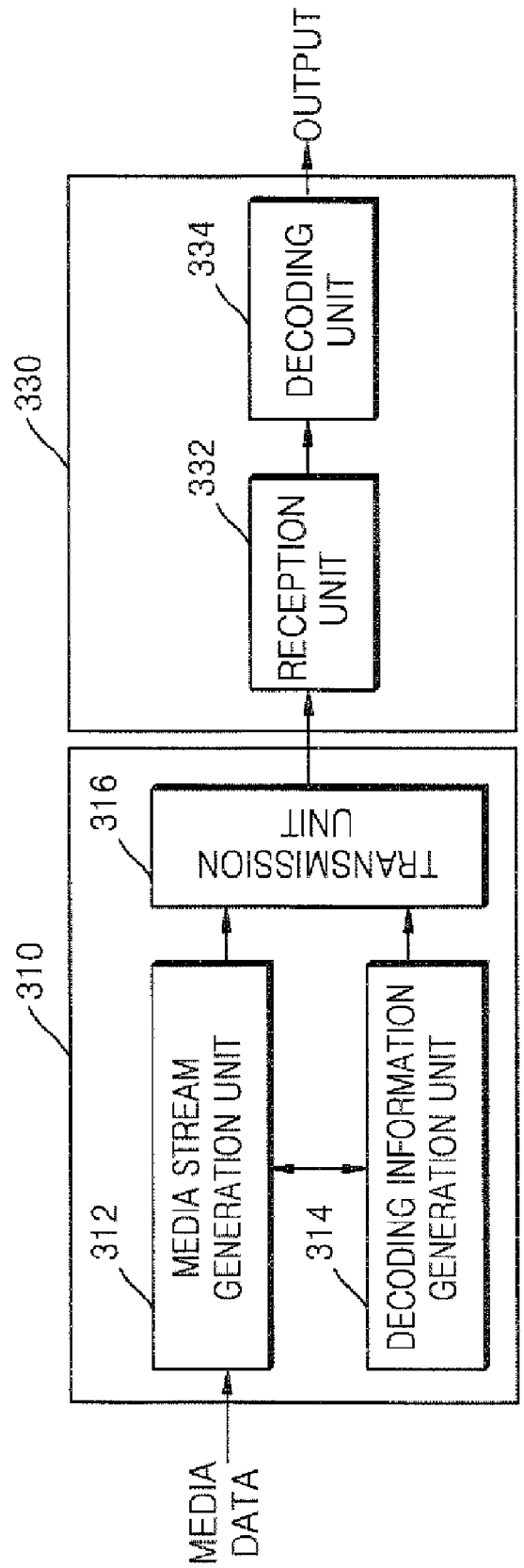
FIG. 3 is an apparatus for transmitting media data, and an apparatus for receiving media data according to an exemplary embodiment of the present invention.

FIG. 3 is an apparatus for transmitting media data, and an apparatus for receiving media data according to an exemplary embodiment of the present invention.

Referring to FIG. 3, a media data transmission apparatus 310 transmits a media stream to a media data reception apparatus 330. The media data transmission apparatus 310 includes a media stream generation unit 312, a decoding information generation unit 314, and a transmission unit 316.

When a media stream is generated, the media stream generation unit 312 generates one or more media data items as one media stream. The media data items included in the media stream generated in the media stream generation unit 312 may have decoding information that are different from each other. This does not mean that the media stream generation unit 312 generates only one media stream.

The decoding information generation unit 314 generates decoding information for one or more media data items, and information for arranging updating of the decoding information.

The information for arranging updating of the decoding information may be valid time information indicating a valid time at which the decoding information is valid, as described above with reference to FIG. 1A; available duration information indicating an available duration of decoding information, as described above with reference to FIG. 1B; version information indicating a version of decoding information, as described above with reference to FIG. 1C; or an update command indicating that updating of the decoding information is required.

The transmission unit 316 transmits the media stream, the decoding information of the media stream and the information for arranging updating of the decoding information. The transmission unit 316 can sequentially transmit decoding information such that the media data reception apparatus 330 can decode media data items having different decoding information with proper timing. The transmission unit 316 can be built with tools for packetizing or multiplexing in order to transmit media streams and decoding information to the media data reception apparatus 330 through a variety of transmission channels.

Meanwhile, the media data reception apparatus 330 receives and processes the media stream transmitted from the media data transmission apparatus 310.

The media data reception apparatus 330 includes a reception unit 332 and a decoding unit 334.

The reception unit 332 receives a media stream including one or more media data items and decoding information of the media stream. When the media stream and the decoding information are packetized or multiplexed for efficient transmission, the reception unit 332 may be built with tools for depacketizing or demultiplexing.

The decoding unit 334 decodes the media stream by using the decoding information of the media stream. The decoding unit 334 interprets the information for arranging updating of the decoding information. The decoding unit 334 determines whether or not the current decoding information is valid, based on the information for arranging updating of the decoding information.

When the information for arranging updating of the decoding information is valid time information indicating a valid time at which the decoding information is valid, as described above with reference to FIG. 1A, if the valid time is over, the current decoding information is not valid any more. When the information for arranging updating of the decoding information is available duration information indicating an available duration of decoding information, as described above with reference to FIG. 1B, if the available duration is over, the current decoding information is not valid any more. When the information for arranging updating of the decoding information is version information indicating a version of decoding information, as described above with reference to FIG. 1C, if decoding information of a new version is received, the current decoding information is not valid any more.

Also, when the information for arranging updating of the decoding information is an update command indicating updated decoding information, if the update command is received, the previous decoding information is not valid any more.

If it is determined that the current decoding information is not valid, the decoding unit 334 receives the next decoding information and decodes the media stream. When the information for arranging updating of the decoding information is a command to command the media data reception apparatus to update the decoding information, decoding is performed by using the decoding information indicated by the update command commanding updating of the decoding information.

Figure 4:
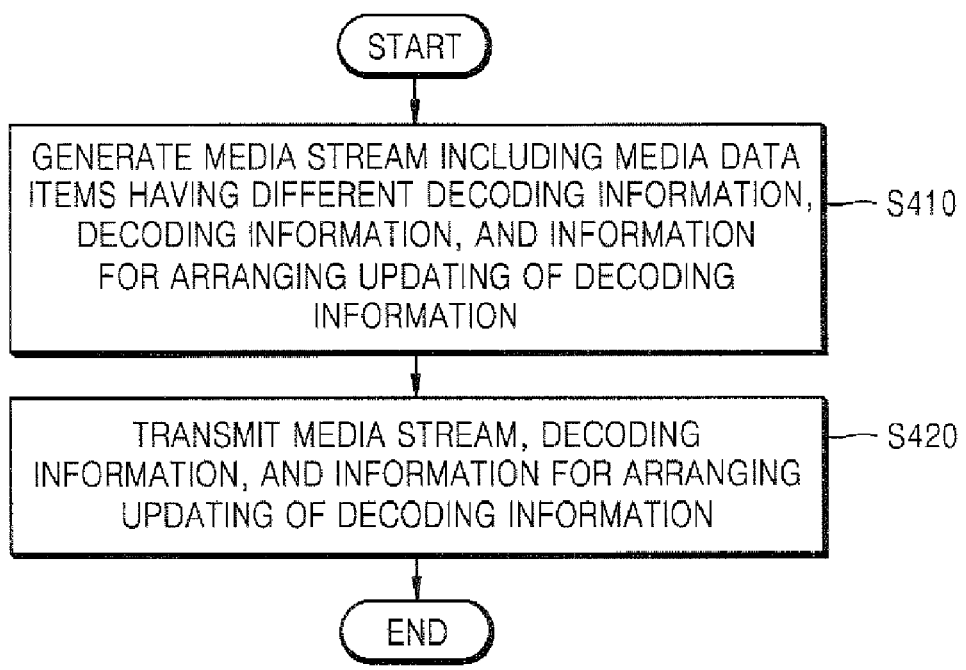
FIG. 4 is a flowchart illustrating a method of transmitting media data according to an exemplary embodiment of the present invention.

FIG. 4 is a flowchart illustrating a method of transmitting media data according to an exemplary embodiment of the present invention.

In operation S410, a media stream including one or more media data items is generated, and one or more decoding information of the media stream and information for arranging updating of the decoding information are generated. In this case, the media stream includes one or more media data items having decoding information that are different from each other.

The information for arranging updating of the decoding information may be valid time information indicating a valid time at which the decoding information is valid, available duration information indicating an available duration of the decoding information, version information indicating a version of the decoding information, or an update command to command the media data reception apparatus to update the decoding information.

In operation S420, the media stream, the decoding information and the information for arranging updating of the decoding information are transmitted. The information for arranging updating of the decoding information may be included in the decoding information and transmitted, or can be transmitted in the form of a command to indicate updating of the decoding information.

Figure 5:
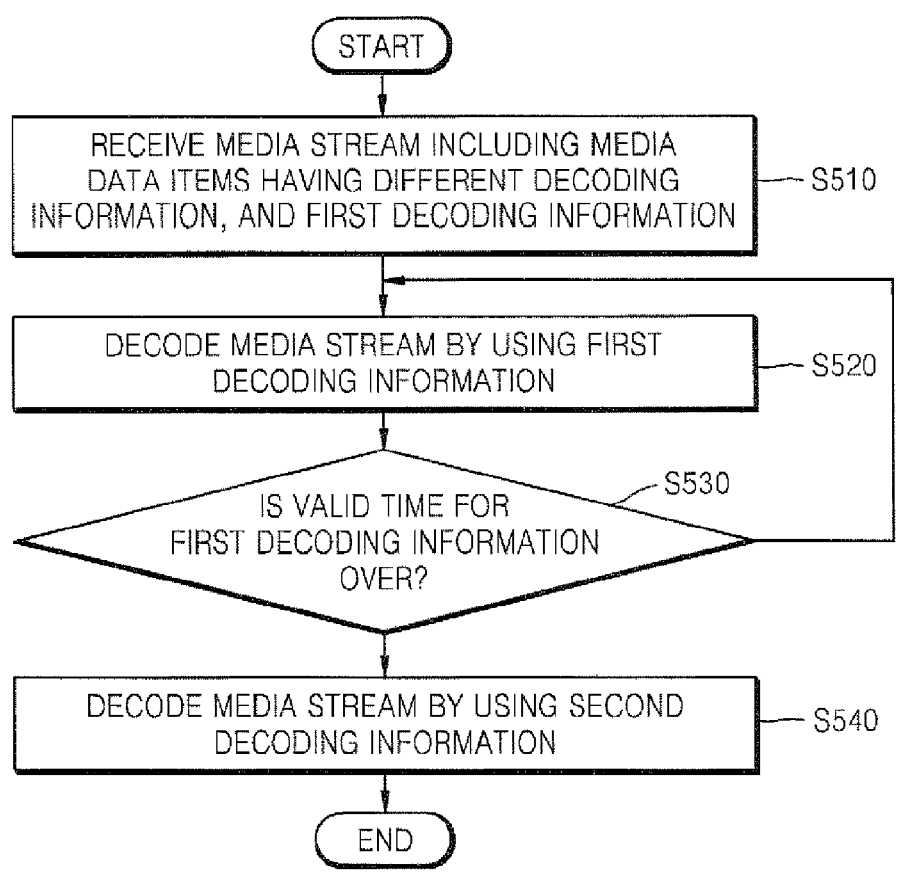
FIG. 5 is a flowchart illustrating a method of receiving media data according to an exemplary embodiment of the present invention.

FIG. 5 is a flowchart illustrating a method of receiving media data according to an exemplary embodiment of the present invention.

In operation S510, a media stream including one or more media data items having decoding information that are different from each other, one or more decoding information of the media stream, and information for arranging updating of the decoding information are received. Assuming that the decoding information of the media stream received in operation S510 is first decoding information, the information for arranging updating of the decoding information can be included in the first decoding information and transmitted. It is assumed that the first decoding information includes valid time information indicating a time when the decoding information is valid, as the information for arranging updating of the decoding information.

In operation S520, the media stream is decoded by using the first decoding information.

In operation S530, in order to determine whether or not the current decoding information is valid, it is determined whether or not the valid time is over, by using the valid time information of the first decoding information which is included in the first decoding information.

In operation S540, if the valid time of the first decoding information is over, second decoding information is newly received, and the media stream is decoded by using the newly received second decoding information.

In operation S540, if the valid time of the first decoding information is not over, the media stream is continuously decoded by using the first decoding information that is the current decoding information.

Figure 6:
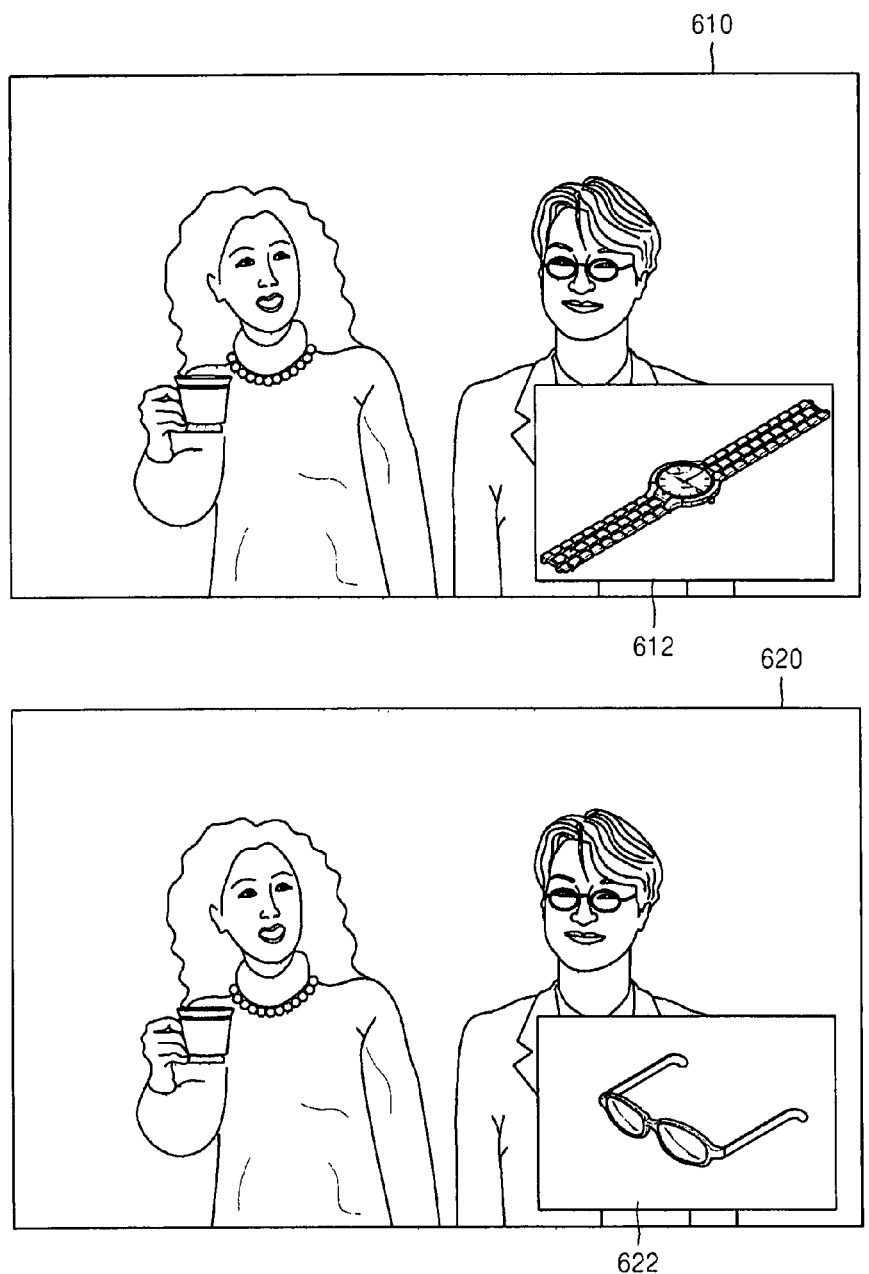
FIG. 6 illustrates scenes explaining a process of reproducing media data according to an exemplary embodiment of the present invention.

FIG. 6 illustrates scenes explaining a process of reproducing media data according to an exemplary embodiment of the present invention.

Referring to FIG. 6, scenes 610 and 620 of an episode are provided with image information on objects appearing in the scenes in sub screens 612 and 622. It is assumed that, in the scenes 610 and 620, media data is provided using binary format for scenes (BIFS), which is scene technology information in an MPEG-4 system.

In the BIFS format, the structure of each media content item for outputting a screen is expressed using a scene tree. Each scene tree is formed with nodes. Each node defines media, graphic layouts, interfaces, and so on. The node defined as media is mapped one-to-one to each elementary stream or media stream. The elementary stream mapped to each node cannot be changed until the node is removed from the scene tree.

Accordingly, when an elementary stream A mapped to a node A of a scene tree is provided in the sub screen 612, a media data transmission apparatus changes the elementary stream A of the node A to an elementary stream B provided as the sub screen 622 of the scene 620, and changes the scene 610 to the scene 620, thereby providing the changed scene 620. To achieve this, first, the media data transmission apparatus removes the node A in the scene tree, declares the node B having the same property as that of the node A, and adds the node B to the scene tree. Then, by mapping the node B and the elementary stream B, the mapping information is transmitted to a media data reception apparatus.

However, according to this exemplary embodiment, the media data transmission apparatus can include information for arranging updating of decoding information in DecoderSpecificInfo of the element stream A, and transmit the information. Media data for providing the sub screens 612 and 622 is included in an elementary stream "1," and is transmitted. The node A is mapped with the elementary stream "1," and is reproduced as the sub screen 612 in the media data reception apparatus. If the valid time transmitted in DecoderSpecificInfo is over, new DecoderSpecificInfo of the elementary stream "1" is received. The new DecoderSpecificInfo includes new decoding information. By using the new decoding information, the media data reception apparatus can decode media data that is decoded by using the new decoding information included in the elementary stream "1," thereby reproducing the sub screen 622 as illustrated in FIG. 6.

The exemplary embodiment of the present invention can be applied to services, such as a slide show, in which images on a screen are continuously updated. For example, in the related art technology, when different decoding information should be used in order to reproduce each image reproduced in a slide show because of different authors who generated the images, a process of removing and adding nodes in a scene tree should be repeatedly performed. However, if the exemplary embodiment of the present invention is applied, by using a time for arranging updating of decoding information, new decoding information is received, the decoding information is updated, and then, the images can be continuously reproduced.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to exemplary embodiments of the present invention, when a first media data item which is transmitted in an existing media stream is desired to be changed to a second media data item having decoding information different from that of the first media data item, and the second media data item is desired to be transmitted, a transmission side of the media stream transmits information for arranging updating of the decoding information of media data items, instead of the related art process of removing an already defined media stream and defining a new media stream for transmission.

In this way, the amount of data to be processed and the complexity of the data processing can be reduced, thereby reducing the time for encoding the media data.

Also, in a reception side of the media stream, since the amount of the data transmitted by the media stream transmission side is reduced, the time for processing and reproducing the media stream can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting media data comprising:
generating a media stream including one or more media data items, one or more decoding information of the media stream, and information for arranging updating of the decoding information; and
transmitting the media stream, the one or more decoding information of the media stream, and the information for arranging updating of the decoding information,
wherein the one or more media data items have decoding information that is for decoding the one or more media data items whose respective media types are different from each other.

2. The method of claim 1, wherein the information for arranging updating of the decoding information is valid time information indicating a valid time at which the decoding information is valid.

3. The method of claim 1, wherein the information for arranging updating of the decoding information is available duration information indicating an available duration of the decoding information.

4. The method of claim 1, wherein the information for arranging updating of the decoding information is version information indicating a version of the decoding information.

5. The method of claim 1, wherein the information for arranging updating of the decoding information is an update command to command a media data reception apparatus to update the decoding information.

6. The method of claim 1, wherein the decoding information includes codec information required for decoding each of the media data items included in the media stream.

7. An apparatus for transmitting media data comprising:
a media stream generation unit which generates one or more media data items as one media stream;
a decoding information generation unit which generates one or more decoding information of the media stream and information for arranging updating of the decoding information; and
a transmission unit which transmits the media stream, the decoding information, and the information for arranging updating of the decoding information,
wherein the one or more media data items have decoding information that is for decoding the one or more media data items whose respective media types are different from each other.

8. The apparatus of claim 7, wherein the information for arranging updating of the decoding information is valid time information indicating a valid time at which the decoding information is valid.

9. The apparatus of claim 7, wherein the information for arranging updating of the decoding information is available duration information indicating an available duration of the decoding information.

10. The apparatus of claim 7, wherein the information for arranging updating of the decoding information is version information indicating a version of the decoding information.

11. The apparatus of claim 7, wherein the information for arranging updating of the decoding information is an update command to command a media data reception apparatus to update the decoding information.

12. The apparatus of claim 7, wherein the decoding information includes codec information required for decoding each of the media data items included in the media stream.

13. A method of receiving media data comprising:
receiving a media stream including one or more media data items, one or more decoding information of the media stream, and information for arranging updating of the decoding information;
decoding the media stream by using the decoding information of the media stream;
determining whether or not a current decoding information is valid, based on the information for arranging updating of the decoding information; and
if the current decoding information is not valid, receiving a next decoding information and decoding the media stream by using the next decoding information,
wherein the one or more media data items have decoding information that is for decoding the one or more media data items whose respective media types are different from each other.

14. The method of claim 13, wherein the information for arranging updating of the decoding information is valid time information indicating a valid time at which the decoding information is valid.

15. The method of claim 13, wherein the information for arranging updating of the decoding information is available duration information indicating an available duration of the decoding information.

16. The method of claim 13, wherein the information for arranging updating of the decoding information is version information indicating a version of the decoding information.

17. The method of claim 13, wherein the information for arranging updating of the decoding information is an update command to command a media data reception apparatus to updating the decoding information.

18. The method of claim 13, wherein the decoding information includes codec information required for decoding each of the media data items included in the media stream.

19. An apparatus for receiving media data, comprising:
a reception unit which receives a media stream including one or more media data items, one or more decoding information of the media stream, and information for arranging updating of the decoding information; and
a decoding unit which decodes the media stream by using the decoding information of the media stream, determines whether or not a current decoding information is valid based on the information for arranging updating of the decoding information, and, if the current decoding information is not valid, receives a next decoding information item and decodes the media stream by using the next decoding information,
wherein the one or more media data items have decoding information that is for decoding the one or more media data items whose respective media types are different from each other.

20. The apparatus of claim 19, wherein the information for arranging updating of the decoding information is valid time information indicating a valid time at which the decoding information is valid.

21. The apparatus of claim 19, wherein the information for arranging updating of the decoding information is available duration information indicating an available duration of the decoding information.

22. The apparatus of claim 19, wherein the information for arranging updating of the decoding information is version information indicating a version of the decoding information.

23. The apparatus of claim 19, wherein the information for arranging updating of the decoding information is an update command to command a media data reception apparatus to update the decoding information.

24. The apparatus of claim 19, wherein the decoding information includes codec information required for decoding each of the media data items included in the media stream.

25. A computer readable recording medium storing a computer program for executing a method of transmitting media data, the method comprising:

generating a media stream including one or more media data items, one or more decoding information of the media stream, and information for arranging updating of the decoding information; and transmitting the media stream, the one or more decoding information of the media stream, and the information for arranging updating of the decoding information, wherein the one or more media data items have decoding information that is for decoding the one or more media data items whose respective media types are different from each other.

26. A computer readable recording medium storing a computer program for executing a method of receiving media data, the method comprising:

receiving a media stream including one or more media data items, one or more decoding information of the media stream, and information for arranging updating of the decoding information;

decoding the media stream by using the decoding information of the media stream;

determining whether or not a current decoding information is valid, based on the information for arranging updating of the decoding information; and if the current decoding information is not valid, receiving a next decoding information and decoding the media stream by using the next decoding information, wherein the one or more media data items have decoding information that is for decoding the one or more media data items whose respective media types are different from each other.

27. The method of claim 1, wherein at least one of the one or more decoding information is defined in DecoderSpecificInfo syntax.

28. The method of claim 2, wherein the information for arranging updating of the decoding information comprises a start time that indicates a start of a time when the decoding information is valid and an end time that indicates an end of a time when the decoding information is valid.

29. The method of claim 15, wherein the determining whether or not a current decoding information is valid comprises adding the available duration information to a start time to determine whether the current time is within the available duration.

30. The method of claim 29, wherein the start time is a composition time stamp of the respective media data.

31. The method of claim 1, wherein the one or more media data items are media data items of different media formats.

32. The method of claim 1, wherein the one or more decoding information are one or more decoding formats that are different from each other.

33. The method of claim 1, wherein the one or more media data items further comprises decoding information that is for decoding the one or more media data items whose respective codecs are different from each other.

34. The method of claim 7, wherein the one or more media data items further comprises decoding information that is for decoding the one or more media data items whose respective codecs are different from each other.

35. The method of claim 13, wherein the one or more media data items further comprises decoding information that is for decoding the one or more media data items whose respective codecs are different from each other.

36. The apparatus of claim 19, wherein the one or more media data items further comprises decoding information that is for decoding the one or more media data items whose respective codecs are different from each other.

* * * * *